Feb. 27, 1923.
W. D. PARDOE.
BRAKE LINING.
FILED NOV. 26, 1921.
1,447,100.
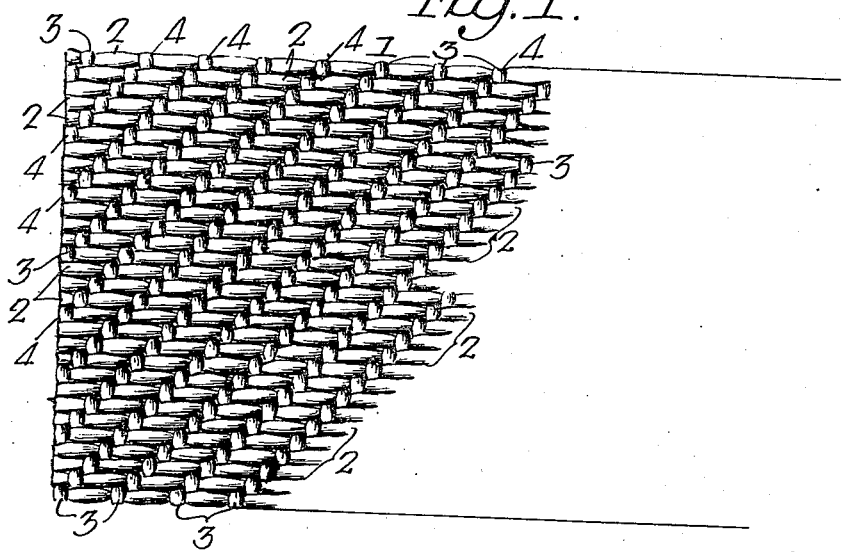
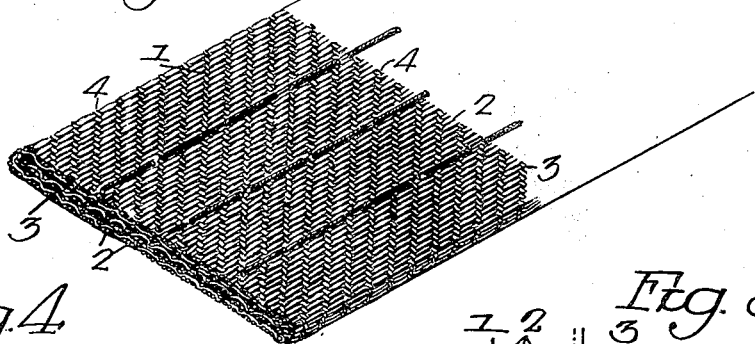
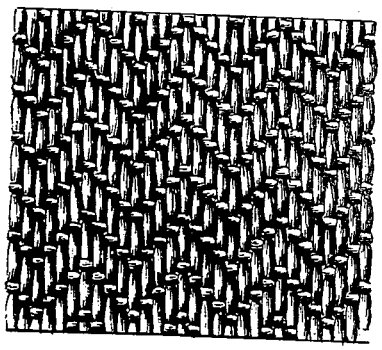
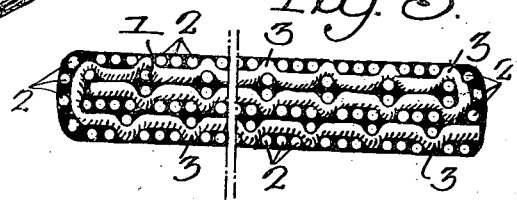
Inventor.
William D. Pardoe.
by his Attorneys.

Patented Feb. 27, 1923.

1,447,100

UNITED STATES PATENT OFFICE.

WILLIAM D. PARDOE, OF TRENTON, NEW JERSEY, ASSIGNOR TO THERMOID RUBBER COMPANY, OF HAMILTON TOWNSHIP, NEW JERSEY, A CORPORATION OF NEW JERSEY.

BRAKE LINING.

Application filed November 26, 1921. Serial No. 518,046.

*To all whom it may concern:*

Be it known, that I, WILLIAM D. PARDOE, a citizen of the United States, residing in Trenton, Mercer County, New Jersey, have invented certain Improvements in Brake Linings, of which the following is a specification.

One object of my invention is to improve the construction of a brake lining made of woven asbestos cloth and strands of wire, whereby the brake lining is rendered more flexible and will hold the rivets to a better advantage than heretofore and will have a more uniform coefficient of friction, which is obtained throughout the life of the lining.

A further object of the invention is to provide a fabric which will not ravel when folded and made into a brake lining.

In the accompanying drawings:

Fig. 1 is a face view of my improved brake lining fabric;

Fig. 2 is a perspective view of a portion of the brake lining made in accordance with my invention;

Fig. 3 is an enlarged sectional view of one edge of the brake lining;

Fig. 4 is a view illustrating a herringbone twill weave; and

Fig. 5 is a view of one of the strands showing the fine wire core.

Referring to the drawings, 1 is a piece of fabric made from strands of asbestos having cores of fine wire in the present instance. 2 are the warp threads and 3 are the weft threads. The fabric is woven so as to form a series of twills, or diagonal ribs, 4, or it may be woven with twills forming what is known as a "herringbone" weave, as in Fig. 4.

The fabric woven with a twill has permanent diagonal ribs and when it is prepared for a brake lining it is impregnated with a binding and friction material, such as a rubber composition. The strip of fabric is folded in any manner desired, depending upon the width and thickness of the required brake lining. The folds of the lining are then secured by a series of stitches, after which it is vulcanized under pressure.

By making the brake lining of fabric having a twill weave, a greater amount of friction material is more evenly distributed throughout the lining than in a plain woven fabric, and a more uniform coefficient of friction is thereby insured.

The fabric can be made with a considerable body without losing its flexibility and it does not have a tendency to ravel when folded into a brake lining.

Furthermore, the securing rivets will hold in the fabric to a better advantage than in a lining in which the ordinary fabric is used.

I claim:

1. A brake lining made of a fabric containing asbestos and strands of wire woven with a twill and impregnated with a binding material, folded and stitched, and vulcanized under pressure.

2. A folded fabric brake lining having a series of diagonal ribs, or twills, and impregnated with a frictional binding material.

WILLIAM D. PARDOE.